United States Patent Office 3,054,804
Patented Sept. 18, 1962

3,054,804
METHOD FOR PREPARING γ-STEAROLACTONE
Daniel Swern and Joseph E. Coleman, Philadelphia, Pa., assignors to the United States of America as represented by the Secretary of Agriculture
No Drawing. Filed Feb. 21, 1961, Ser. No. 90,893
2 Claims. (Cl. 260—343.6)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of γ-stearolactone:

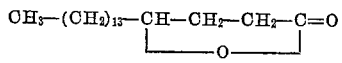

The compound γ-stearolactone is a very convenient and probably the best source of γ-hydroxystearic acid (4-hydroxyoctadecanoic acid). Either of these compounds is readily converted to a variety of metallic salts for use as high temperature greases, herbicides or fungicides. The γ-lactone may also be cleaved oxidatively to give mono- and dicarboxylic acids.

Hitherto, γ-stearolactone has been prepared by reacting oleic acid with concentrated sulfuric acid at elevated temperatures. The rigorous conditions of this reaction cause considerable destruction of the fatty acid chain, resulting in poor yields of the desired lactone and appreciable impurities, including charred materials. The isolation of crude γ-stearolactone from the reaction mixture is extremely tedious and difficult because of emulsion problems, and the crude product is not easily purified.

An object of the present invention is to provide an efficient process for preparing γ-stearolactone, that is, a process which will give high yields of a product which can be readily isolated and purified.

Other objects and a fuller understanding of the invention may be had by referring to the following description and claims..

In general, according to the present invention oleic acid and about 65 to 75% aqueous perchloric acid are combined, preferably in about equimolar amounts, and heated at moderate temperatures, such as in the range of about from 90 to 110° C. to produce γ-stearolactone, and the γ-stearolactone is then readily isolated from the reaction mixture. A convenient means of isolating the lactone is to cool the reaction mixture, combine it with a suitable solvent for the γ-stearolactone, for example, a substantially water-immiscible organic solvent such as diethyl ether, separate the organic solvent layer from the aqueous layer, wash the organic solvent layer with water, and then evaporate the solvent to obtain γ-stearolactone as a nonvolatile residue. Alternatively the γ-stearolactone, which forms a liquid layer over the aqueous perchloric acid, can be separated mechanically and washed with warm water until free of perchloric acid.

We prefer to use as the aqueous perchloric acid the readily available and safe commercial perchloric acid which normally contains between about 65 and 75% perchloric acid. When the aqueous perchloric acid is much in excess of 75% perchloric acid, it is possible to obtain explosive mixtures of organic compounds with it. When the perchloric acid concentration is much below 65% it is too dilute to serve as an effective reactant. Hence, while the reaction of oleic acid may proceed in varying degrees with higher or lower concentrations of perchloric acid, between about 65 and 75% is a convenient operating concentration.

Although other ratios of oleic acid and perchloric acid may be used, we prefer approximately equimolar quantities of the reactants. Since excellent yields of γ-stearolactone are obtained with this ratio it is not necessary or particularly advantageous to employ larger quantities of perchloric acid. Under the conditions employed only a portion of the perchloric acid is destroyed. After the γ-stearolactone is extracted from the reaction mixture with the solvent, the aqueous layer containing perchloric acid may be concentrated to desired strength and reused.

At the scale of operation described in the example, the exothermicity of mixing perchloric acid with oleic acid causes no problem. In large scale runs, however, it is necessary to cool when the reactants are mixed to avoid obtaining a temperature too high to be controlled. Temperatures much in excess of 110° C. cause considerable darkening of the product and by-products are formed which are difficult to separate from the γ-stearolactone. At temperatures in the range of about from 90 to 100° C. excellent yields of γ-stearolactone are obtained in reaction times of only one or two hours. Temperatures lower than 90° may also be used, but progressively longer reaction times are required. Temperatures below about 60° C. are considered impractical.

The following example is presented in illustration of but not in limitation of the practice of the present invention.

*Example 1*

Fourteen grams (0.050 mole) of oleic acid and 6.95 grams (0.050 mole) of 72% perchloric acid were combined in a two-neck round-bottom flask equipped with a condenser and a thermometer. The mixture was heated on a steam bath at 90–100° C. for about two hours. The reaction mixture was allowed to cool, dissolved in diethyl ether, the ether layer separated from the aqueous layer, washed with water until free of acid, and then dried over sodium sulfate. The ether solution was separated from the sodium sulfate and the ether evaporated, yielding 13 grams of a semi-solid. Recrystallization of this semi-solid from acetone (5:1 ratio) gave 8 grams (60% yield) of γ-stearolactone, M.P. 47–51° C. Infrared examination, chemical analysis and mixed melting point determination with an authentic sample of γ-stearolactone confirmed the structure of this product.

The yield of γ-stearolactone from this process is effected by the grade of oleic acid employed as the starting material. Commercial oleic acid may contain from about 60 to 90% oleic acid. The higher the percentage of oleic acid in the starting material, the better the yield of γ-stearolactone.

Reacting the γ-stearolactone with an aqueous base opens the lactone ring and gives the corresponding salt of γ-hydroxystearic acid. Preferred bases are the hydroxides of sodium, potassium, lithium, calcium, barium, ammonium and the like. Some of these salts can be employed directly in special lubricants or used for other commercial purposes. In a process for obtaining the free γ-hydroxystearic acid the most practical bases for reacting with the lactone are sodium or potassium hydroxide. Acidifying the salt solution gives γ-hydroxystearic acid. Many acids may be used for this purpose, the principal requirement being that they have an ionization constant greater than that of γ-hydroxystearic acid. Convenient acids for this purpose are dilute hydrochloric, sulfuric or nitric acid. The product, γ-hydroxystearic acid, is water-insoluble and is easily washed free of water soluble impurities.

The following example illustrates the preparation of γ-hydroxystearic acid.

*Example 2*

A 3 gram sample of the γ-stearolactone prepared in

Example 1 was heated with dilute alcoholic potassium hydroxide on the steam bath. After 1 hour the alkaline solution was acidified with dilute hydrochloric acid. The insoluble white solid was separated, washed and dried to give 2.7 grams (90% yield) of γ-hydroxystearic acid, M.P. 84–85° C. The identity of the product was confirmed by chemical analysis.

We claim:

1. A process for preparing γ-stearolactone comprising combining oleic acid and an aqueous perchloric acid solution containing about from 65 to 75% perchloric acid, heating the oleic acid-aqueous perchloric acid reaction mixture at a temperature in the range of about from 90 to 110° C. to produce γ-stearolactone, and separating γ-stearolactone from the reaction mixture.

2. A process for preparing γ-hydroxystearic acid comprising combining oleic acid and an aqueous perchloric acid solution containing about from 65 to 75% perchloric acid, heating the oleic acid-aqueous perchloric acid reaction mixture at a temperature in the range of about from 90 to 110° C. to produce γ-stearolactone, heating the γ-stearolactone thus produced with an aqueous base to produce a salt of γ-hydroxystearic acid, acidifying the alkaline salt solution with an acid having an ionization constant greater than that of γ-hydroxystearic acid, and separating γ-hydroxystearic acid from the acidified salt solution.

No references cited.